May 7, 1963
G. F. THOMPSON
3,088,330
MECHANICAL LINKAGE FOR REMOTE CONTROL
Filed Jan. 14, 1960
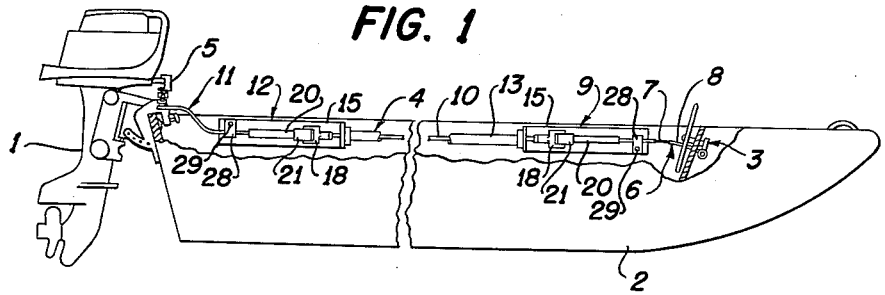
FIG. 1
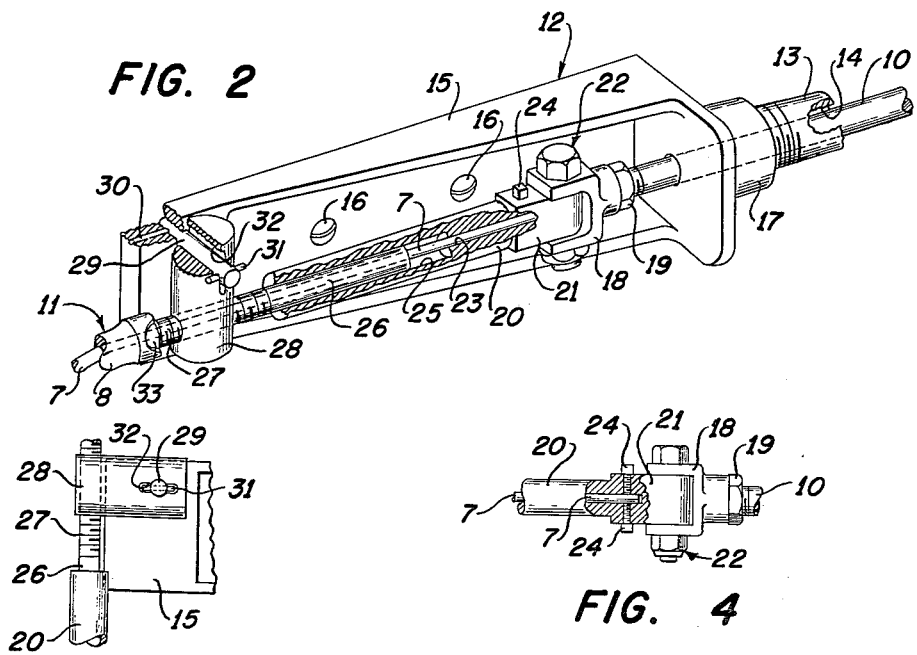
FIG. 2
FIG. 3
FIG. 4
INVENTOR.
GEORGE F. THOMPSON
BY
*Andrus & Starke*
Attorneys United States Patent Office 3,088,330
Patented May 7, 1963

3,088,330
MECHANICAL LINKAGE FOR REMOTE CONTROL
George F. Thompson, Sarasota, Fla., assignor, by mesne assignments, to Kiekhaefer Corporation, Chicago, Ill., a corporation of Delaware
Filed Jan. 14, 1960, Ser. No. 2,465
7 Claims. (Cl. 74—501)

This invention relates to a mechanical linkage for remote control and is particularly directed to a push-pull type linkage having a straight transmission path between the input and the output of the linkage. The invention is more particularly adapted to connection of forward mounted steering and throttle controls in a boat to operate an outboard motor mounted on the aft end of the boat.

Outboard motors are conventionally mounted on the aft end of a boat. A steering and throttle control is provided in the front portion of the boat. For many years pulleys and ropes or other flexible members were employed to connect the steering mechanism and the throttle mechanism to the motor to allow remote control of the motor speed and position. More recently, push-pull types of mechanical motion transmissions have been employed to transmit the movement of the steering and throttle controls to the motor. For example, the United States Patent 2,875,722 to L. P. Post discloses a push-pull transmission system having a conventional flexible cable connecting the controls to the motor.

The flexible cables employed are generally of the standard construction having a movable central core wire of a relatively flexible characteristic which transmits the motion. The movable central core wire is housed within a suitable protective sheath which is secured at opposite ends to the control and to the motor respectively. The push-pull control has many advantages over the older rope and pulley type control. However, a certain amount of play is inherently established in the control. The core wire cannot be held too closely within the protective sheath because the resulting friction forces between the core wire and the sheath would cause difficult and inefficient operation. Consequently, a certain clearance is provided between the sheath and the core to allow easy movement of the core wire. The clearance allows the core wire to flex within the sheath and consequently creates a certain amount of play or lost motion in the transmission system. The lost motion reduces the sensitivity and the response of the control.

In accordance with the present invention, relatively short flexible cables are secured to the motor and to the input control. A rigid transmission rod extends substantially the complete length of the boat and is journaled in suitable supporting brackets for axial reciprocation. The core wires of the respective flexible cables are secured to the contiguous ends of the rod and the rod transmits the motion from the control cable to the motor cable. The rod is coaxially housed within a tubular protective housing to prevent engagement of the rod by objects and personnel in the boat. The housing is radially spaced from the transmission rod and consequently very minimum friction forces are established in the transmission of the motion between the flexible cables. The rigid rod establishes immediate and sensitive response. The short flexible cables introduce very inappreciable lost motion and friction forces into the system and consequently do not noticeably effect the transmission of the motion.

In accordance with another aspect of the invention, the coupling adjacent each end of the rod to the adjacent flexible cable includes a mounting bracket having a journal or opening to slidably support the adjacent end of the transmission rod. A pivotal support member is secured to the bracket in spaced relation to the journal and includes an opening aligned with the journal when the support member is disposed in operating position. A two-part telescoped housing is rigidly secured at opposite ends to the rod and to the pivotal support member and includes a passage adapted to receive the core wire of the adjacent flexible cable. The positioning of the transmission rod is transmitted to the connected core wire of the adjacent flexible cable through the rod-connected component of the two-part telescoped housing.

The pivotal support member facilitates the connection of the telescoped housing to the adjacent end of the transmission rod. The housing is first assembled with the pivotal member and with the incoming flexible cable. The pivotal support member is then mounted on the mounting bracket and pivoted into position or alignment with the coupling means carried by the rod. The rigidity of the housing and coupling to the transmission rod is sufficient to eliminate the tendency of the pivotal member to introduce lost motion into the transmission system.

Thus the present invention establishes a high-efficient push-pull type coupling with a very minimum of lost motion and friction. The flexible cables are readily coupled and decoupled to the rigid rod.

The drawing furnished herewith illustrates the best mode presently contemplated for carrying out the invention.

In the drawing:

FIG. 1 is a side elevational view of a boat driven by an outboard motor having parts broken away to show the coupling between a front steering mechanism and an outboard motor in accordance with the present invention;

FIG. 2 is a perspective view of the attachment means mounted adjacent the motor for connecting a flexible cable to a rigid interconnecting transmission rod;

FIG. 3 is a front view of a portion of the attachment means with parts broken away to show certain details of construction; and FIG. 4 is a front view of another portion of the attachment means shown in FIG. 2.

Referring to the drawings, and particularly to FIG. 1, an outboard motor 1 is shown mounted to the aft end of a boat 2 and is adapted to propel the boat through water, not shown. In accordance with conventional practice, the motor 1 is adapted to be pivoted about a vertical axis to effect steering of the boat 2. A steering apparatus 3 is mounted adjacent the forward part of the boat and is connected by a transmission linkage 4 constructed in accordance with the present invention, to a motor positioner 5 carried by the motor 1. The movement of the steering apparatus 3 is transmitted by the linkage 4 to the motor positioner 5 to pivot the motor 1 about a vertical axis and to thus steer the boat 2.

The steering apparatus 3 is of any conventional variety and is illustrated generally as a conventional gear and rack assembly adapted to establish a push-pull output. A flexible cable 6 is secured to a gear mechanism, not shown, to establish a push-pull motion connection incident movement of the steering apparatus 3.

The flexible cable 6 includes central core wire 7 which is connected to the steering apparatus and adapted to reciprocate within a protective outer sheath 8.

A connector 9 is mounted adjacent the forward part of the boat 2 and is adapted to tie the free end of core wire 7 to the contiguous end of a rigid rod 10 which extends rearwardly within boat 2.

The opposite end of rod 10 is connected by a flexible cable 11 and a connector 12 to the motor positioner 5. The positioner 5 is any suitable apparatus adapted to pivot the motor 1 about a vertical axis in response to a push-pull mechanical input. The illustrated positioner is similar to that described and claimed in the above-mentioned post patent.

The flexible cable 11 and the connector 12 are identical to the flexible cable 6 and connector 9. In FIGS. 2–4, enlarged illustrations for connector 12 are shown and described hereinafter. The position of the components in connectors 9 and 12 are relatively reversed because of the right hand and left hand connection to the adjacent flexible cables, as viewed in FIG. 1.

In operation, the motion of the steering apparatus 3 is transmitted through the short flexible cable 6 to the rod 10 which transmits the motion through the short flexible cable 11 to the positioner 5.

A tubular housing 13 concentrically encircles the rigid rod 10 and is rigidly secured at opposite ends to the connectors 9 and 12. The inner diameter of the housing 13 is slightly greater than the outer diameter of the rod 10 to establish a friction-free passage 14 within the housing 13 for the rod.

The rod 10 establishes a rigid and direct connection having no lost motion and a minimum of friction between the short flexible cables 6 and 11. The response of the movement of the motor 1 incident movement of the steering apparatus 3 is essentially instantaneous. Practically all of the movement in the steering apparatus 3 is transmitted to the positioner 5 for the motor 1 and consequently the sensitivity of the steering control is excellent.

Referring particularly to FIGS. 2 and 3, the connector 12 for the connection of the positioner 5 to the adjacent end of the rod 10 is shown in detail. The connector 9 is identical to the connector 12 as previously noted and corresponding elements in the two connectors are correspondingly numbered in FIG. 1.

The connector 12 includes an elongated mounting bracket 15 and is secured within the boat 2 immediately adjacent the motor 1 by suitable small mounting screws 16 or the like. The bracket 15 includes a cylindrical boss 17 which projects longitudinally from the bracket 15 toward the front of boat 2. The boss 17 is suitably apertured to slidably support the rod 10 for longitudinal movement through the boss. The boss 17 also includes a threaded recess which is adapted to receive a corresponding threaded end of the housing 13 to rigidly support the housing 13 coaxially of the rod 10.

The rod 10 projects through the opening in the boss 17 and terminates in a threaded end. A bifurcated yoke 18 is threadedly secured onto the end of the rod 10 and is locked in place by a suitable jam nut 19. A cable housing guide 20 includes a flat-faced enlargement 21 which projects between the arms of the bifurcated yoke 18. A bolt and nut assembly 22 extends through suitably aligned openings in the enlargement 21 and the arms of yoke 18 to removably secure the housing guide 20 to the rod 10. The guide 20 includes a central passage 23 which terminates generally within the beginning of a flat-faced enlargement 21. The inner end of the passage 23 generally corresponds to the diameter of the core wire 7 of the adjacent flexible cable 11 and is adapted to receive the end of the core wire 7. Oppositely disposed clamp bolts 24 thread into suitably aligned lateral openings in the flat-faced enlargement 21 and when drawn up rigidly clamp the core wire 7 therebetween, and thus to the rod 10. Consequently the movement of the rigid rod 10 is transmitted to the core wire 7 and thus to the motor positioner 5 to pivot motor 1.

The outer end of the central passage 23 is enlarged as at 25. A tubular cable housing 26 is slidably telescoped into the enlarged portion 25 of the passage 23 and terminates in an outer threaded portion 27. A pivotal coupling member 28 is pivotally secured to the bracket 15 in spaced relation to boss 17 and includes a tapped opening aligned with the cable housing 26. The threaded portion 27 is threaded into the tapped opening of coupling member 28. A pivot shaft 29 is secured within an opening in the bracket 15 and extends laterally therefrom to pivotally support the coupling member 28 in position. A lock pin 30 is press fitted through aligned openings in the bracket 15 and the shaft 29 to securely lock the shaft to the bracket. A retainer pin 31 extends through the outer end of the shaft 29 to secure the coupling member 28 to the shaft. The pin 31 extends perpendicularly to the axis of the shaft 29 and parallel to the axis of the cable housing 26. The coupling member 28 includes a slot 32 extending through the opening for the shaft 29 parallel to the axis of the coupling member 28 and thus perpendicular to the axis of the cable housing 26. The coupling member 28 may be removed from shaft 29 by pivoting the coupling member 28 through 90 degrees to align pin 31 with slot 32.

Referring particularly to FIG. 1, the pivot shaft 29 is respectively below the housing 26 in connector 9 and above the housing 26 in connector 12. This arises because the illustrated connectors 9 and 12 are identical whereas the flexible cables 6 and 11 approach the connectors from opposite directions.

The threaded portion 27 of the tubular cable housing 26 extends outwardly from the coupling member 28 to receive a threaded ferrule 33 which is wedged within the sheath 8 of the adjacent flexible cable 11. The ferrule 33 rigidly interconnects the flexible cable 11 to the housing 26 to establish and maintain a smooth continuous passage for the core wire 7 from the flexible cable 11 into the housing 26.

In connecting the flexible cable 11 to the rod 10, coupling member 28 is removed from the pivot shaft 29. The cable housing 26 is threaded into the tapped opening in the coupling member 28 and the ferrule 33 of flexible cable 11. The core wire 7 passes through the passage in the housing 26 and the cable housing guide 20 is telescoped over the cable housing 26 with the core wire 7 extending into the passage 23. The clamp bolts 24 are drawn up to securely clamp the core wire 7 in place and rigidly interconnect the core wire 7 and cable housing guide 20. In the disassembled or pivoted position of coupling member 28 as shown in FIG. 3, the clamping bolts 24 are readily accessible and may be conveniently drawn up. The coupling member 28 is positioned on the threaded portion 27 of housing 26 prior to mounting upon shaft 29 by rotating the coupling member 28 about the axis of housing 26 to correctly locate the coupling member 28 relative to the bifurcated yoke 18. The coupling member 28 is mounted on shaft 29 by aligning the slot 32 with the retainer pin 31 and, upon clearing the retainer pin 31, the entire assembly is rotated 90 degrees to the position shown in FIG. 2 with the flat-faced enlargement 21 of the guide 20 within the bifurcated yoke 18. The bolt and nut assembly 22 is passed through the suitably aligned opening and drawn up to releasably interconnect the cable guide 20 to the yoke 18 and thus to the rod 10.

As the steering apparatus 3 is actuated, the core wire 7 of cable 6 moves longitudinally and positions the attached housing guide 20. The rigid rod 10 is attached to the housing guide 20 by the yoke 18 and consequently transmits the motion to the opposite core wire 7 of cable 11 through the corresponding yoke and housing guide coupling adjacent motor 1. The motor positioner 5 is thus actuated to pivot the motor 1 about the vertical axis and thereby cause the boat 2 to follow a predetermined path.

The friction forces between the core wire 7 and the cable housing 26 may tend to cause the housing to pivot the supporting coupling member 28 about the pivot shaft 29 and thus introduce some lost motion into the linkage connection. In the assembled position however, as shown in FIGS. 1 and 2, the connection of the cable housing guide 20 to the rod 10 and the housing 26 to the coupling member 28 establishes a substantially rigid connection and any lost motion in the connector will be so slight as to be inconsequential.

The rigid rod 10 transmits the mechanical motion between the flexible cables 6 and 11 in an essentially friction-free manner. There is no lost motion existing between the core wires 7 and consequently the movement or response, as previously noted, is essentially instantaneous.

The connectors 9 and 12 provide a means of readily tying the core wires 7 of the respective flexible cables 6 and 11 to the rigid rod 10. The coupling member 28 facilitates the connection of the incoming core wire 7 to the guide 20 and the connection of the guide to the yoke 18.

Although the illustrated embodiment of the invention is specifically directed to the remote control of a steering mechanism in an outboard motor assembly, the invention is equally applicable to other conventional push-pull motion transmission assemblies having a relatively long, straight coupling path.

The present invention thus provides a high-efficiency, push-pull type transmission allowing positive and easy remote control of a motor or the like.

Various modes of carrying out the invention are contemplated as being within the scope of the followiing claims particularly pointing out and distinctly claiming the subject matter which is regarded as the invention.

I claim:

1. A transmission linkage of the push-pull variety, which comprises a pair of flexible cables adapted to be connected as the input and output connections and each having a core wire and a tubular guide sheath therefor, a rigid elongated link adapted to span the distance between the flexible cables, releasable coupling means adjacent each end of the link and each including: support brackets to slidably support said elongated link, a pair of telescoped members each secured at one end to the adjacent end of the link, support members pivotally secured to the support brackets in spaced relation to the link, means to removably secure the opposite ends of the telescoped members to the support members, guide passages in the telescoped members to receive the corresponding core wire, and means to releasably secure the core to the portion of the telescoped members secured to the link.

2. A transmission linkage of the push-pull variety, which comprises a pair of flexible cables having a protective sheath surrounding a central core wire adapted to be connected as the input and output connections, a rigid rod-like link adapted to span the distance between the flexible cables, individual connector means to secure the core wires to the contiguous ends of the link, each of said connector means including a mounting bracket adapted to be mounted adjacent the ends of the link and having means to slidably support the rod-like link, a tubular guide encompassing the rod-like link and secured to the mounting brackets, separate support members pivotally secured to each of the mounting brackets and having openings aligned with the link, a pair of two-part telescoped housings including a cable housing and a housing guide having a central passage, said housings being secured as part of the connectors with the cable housing removably secured within the opening in the corresponding support member and the housing guide telescoped with the housing and releasably attached to the adjacent end of the link, and means to secure the corresponding core wire within the passage of the corresponding housing guide.

3. A mechanical linkage of the push-pull type, which comprises a flexible cable having a central core wire housed with an outer protective guide sheath, a support bracket having an apertured boss, a rigid rod-like link slidably supported in the boss, a rigid tubular guard secured to the boss and concentrically encasing said rod-like link in radially spaced relation to define a friction-free passage for said rod, a coupling member, a shaft secured to the bracket in spaced relation to said boss and pivotally supporting the coupling member which has a threaded opening aligned with the rod-like link, a housing having a threaded portion threaded through the opening in the coupling member, means to secure the outer protective guide sheath of the flexible cable to the adjacent end of the housing, a tubular guide telescoping the housing between the coupling member and the boss and aligned with the link, said housing and said guide having a central passage to receive the core wire of the flexible cable, means coupled to the tubular guide and adapted to clamp the core wire to the guide, and a removable connection releasably securing the adjacent ends of the tubular guide and the rigid rod-like link.

4. A connector for securing a central core wire of a flexible cable to a rigid transmission linkage, which comprises a support bracket having an apertured boss, a rigid rod-like link slidably supported in the boss, a rigid tubular guard secured to the boss and concentrically encasing said rod-like link in radially spaced relation to define a friction-free passage for said rod, a coupling member having a threaded opening, a shaft secured to the bracket in spaced relation to said boss and pivotally supporting the coupling member with its threaded opening aligned with the rod-like link, a pin extending through the outer end of the shaft perpendicular to the axis of the shaft, said coupling member having a slot extending parallel to the axis of the shaft whereby the coupling member is removable by rotating the coupling through 90 degrees, a housing having a threaded portion threaded through the opening in the coupling member, means to secure the outer cover of the flexible cable to the adjacent end of the housing, a closed-end tubular guide telescoping the housing between the coupling member and the boss and having a passage to receive the core wire of the flexible cable, screw means journaled in the guide and adapted to clamp the core wire to the guide, and a yoke connection releasably securing the adjacent end of the guide to the rigid rod-like link.

5. A connector for securing a central core wire of a flexible cable to a rigid transmission rod, which comprises a mounting bracket, a support secured to the bracket to slidably support the rod, a pivotal support member secured to the bracket in spaced relation to the support, a two-part telescoped housing secured at opposite ends to the rod and to the pivotal support member and having a passage to receive said core wire, and means to releasably attach the core wire to the part of the housing secured to the rod to transmit the position of the rod to the core wire.

6. A connector for securing a central core wire of a flexible cable to a rigid transmission rod, which comprises a mounting bracket, a support secured to the bracket to slidably support the rod, a pivotal support member releasably secured to the bracket in spaced relation to the support and having a threaded opening aligned with the support, a two-part telescoped housing having one member secured to the rod and the second member having a threaded portion threaded through the opening in the pivotal support member, said telescoped housing having a passage to receive said core wire, and means to releasably attach the core wire to the part of the housing secured to the rod to transmit the position of the rod to the core wire.

7. A transmission linkage of the push-pull type, comprising a pair of flexible cables adapted to be connected as input and output means each having a reciprocal core wire and a guide sheath therefor, one end of the input cable being connected to drive means to effect relative reciprocation between the core and sheath at the opposite end thereof, and one end of the output cable being connected to driven means to effect actuation thereof by relative reciprocation between the core and sheath at the opposite end thereof, a fixed bracket rigidly supporting the said opposite end of each corresponding cable sheath in substantially aligned spaced relation, a rigid transmission rod carried by said brackets in bearings providing for axial reciprocation of the rod in substantial alignment with said cable sheaths, and means releasably carried by said rod and securing the ends of the same to the corresponding adjacent ends of said core wires to transmit directly reciprocal movement of said input core wire to said output core wire.

References Cited in the file of this patent

UNITED STATES PATENTS

| | | |
|---|---|---|
| 1,776,957 | Sneed | Sept. 30, 1930 |
| 1,791,644 | Sneed | Feb. 10, 1931 |
| 1,927,615 | Ponti et al. | Sept. 19, 1933 |
| 2,817,005 | Cameron | Dec. 71, 1957 |
| 2,875,722 | Post | Mar. 3, 1959 |
| 2,915,915 | McKay | Dec. 8, 1959 |
| 2,961,986 | Rockhill | Nov. 29, 1960 |
| 3,021,722 | Bratz et al. | Feb. 20, 1962 |

FOREIGN PATENTS

| | | |
|---|---|---|
| 589,941 | Great Britain | July 3, 1947 |
| 819,398 | France | July 5, 1937 |
| 1,142,686 | France | Apr. 1, 1957 |